(12) United States Patent
Zhang et al.

(10) Patent No.: US 10,357,850 B2
(45) Date of Patent: Jul. 23, 2019

(54) METHOD AND APPARATUS FOR MACHINING A WORKPIECE

(71) Applicant: ELECTRO SCIENTIFIC INDUSTRIES, INC., Portland, OR (US)

(72) Inventors: Haibin Zhang, Portland, OR (US); Glenn Simenson, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 819 days.

(21) Appl. No.: 14/033,368

(22) Filed: Sep. 20, 2013

(65) Prior Publication Data
US 2014/0083986 A1 Mar. 27, 2014

Related U.S. Application Data

(60) Provisional application No. 61/705,038, filed on Sep. 24, 2012, provisional application No. 61/705,559, filed on Sep. 25, 2012.

(51) Int. Cl.
| | |
|---|---|
| *B23K 26/36* | (2014.01) |
| *B23K 26/53* | (2014.01) |
| *B23K 26/352* | (2014.01) |
| *B23K 26/00* | (2014.01) |
| *B23K 26/40* | (2014.01) |
| *B23K 26/382* | (2014.01) |
| *B23K 26/359* | (2014.01) |

(Continued)

(52) U.S. Cl.
CPC ........ *B23K 26/352* (2015.10); *B23K 26/0006* (2013.01); *B23K 26/359* (2015.10); *B23K 26/389* (2015.10); *B23K 26/40* (2013.01); *B23K 2103/05* (2018.08); *B23K 2103/08* (2018.08); *B23K 2103/10* (2018.08); *B23K 2103/14* (2018.08); *B23K 2103/50* (2018.08); *B23K 2103/52* (2018.08); *B23K 2103/54* (2018.08); *B23K 2103/56* (2018.08)

(58) Field of Classification Search
IPC .................................. B23K 26/38; H01L 21/00
See application file for complete search history.

(56) References Cited

U.S. PATENT DOCUMENTS

| | | |
|---|---|---|
| 3,287,200 A | 11/1966 | Hess et al. |
| 4,702,042 A | 10/1987 | Herrington et al. |

(Continued)

FOREIGN PATENT DOCUMENTS

| | | |
|---|---|---|
| CN | 1657220 A | 8/2005 |
| CN | 101073145 A | 11/2007 |

(Continued)

OTHER PUBLICATIONS

Rico Böhme, "Laser-Induced Backside Wet Etching of Glasses and Crystals", Nov. 6, 2007, 139 pages.

(Continued)

*Primary Examiner* — Ibrahime A Abraham
*Assistant Examiner* — Gyounghyun Bae (57) ABSTRACT

The invention is method, and an apparatus for performing the method having the steps of providing a workpiece, generating a plurality of free electrons at a region of the exterior surface, and machining a portion of the workpiece adjoining the first region by directing laser energy onto the workpiece.

50 Claims, 5 Drawing Sheets

(51) Int. Cl.

| | | |
|---|---|---|
| B23K 103/00 | (2006.01) | |
| B23K 103/04 | (2006.01) | |
| B23K 103/08 | (2006.01) | |
| B23K 103/10 | (2006.01) | |
| B23K 103/14 | (2006.01) | |

(56) References Cited

U.S. PATENT DOCUMENTS

| | | | |
|---|---|---|---|
| 4,828,900 A | 5/1989 | Mouly | |
| 4,847,184 A * | 7/1989 | Taniguchi | B27M 1/06 430/346 |
| 5,043,553 A | 8/1991 | Corfe et al. | |
| 5,413,664 A | 5/1995 | Yagi et al. | |
| 5,543,365 A | 8/1996 | Wills et al. | |
| 5,609,284 A | 3/1997 | Kondratenko | |
| 5,637,244 A | 6/1997 | Erokhin | |
| 5,656,186 A | 8/1997 | Mourou et al. | |
| 5,665,134 A | 9/1997 | Kirby et al. | |
| 5,826,772 A | 10/1998 | Ariglio et al. | |
| 5,968,441 A | 10/1999 | Seki | |
| 5,973,290 A | 10/1999 | Noddin | |
| 6,143,382 A | 11/2000 | Koyama | |
| 6,211,488 B1 | 4/2001 | Hoekstra et al. | |
| 6,313,435 B1 * | 11/2001 | Shoemaker | B41J 2/14 219/121.7 |
| 6,326,589 B1 | 12/2001 | Beersiek et al. | |
| 6,333,485 B1 | 12/2001 | Haight et al. | |
| 6,442,974 B1 * | 9/2002 | Paananen | B32B 17/1099 65/30.13 |
| 6,521,862 B1 | 2/2003 | Brannon | |
| 6,634,186 B2 | 10/2003 | Abe | |
| 6,642,476 B2 | 11/2003 | Hamann | |
| 6,642,477 B1 | 11/2003 | Patel et al. | |
| 6,756,563 B2 | 6/2004 | Gross et al. | |
| 6,795,274 B1 | 9/2004 | Hsieh et al. | |
| 6,809,291 B1 | 10/2004 | Neil et al. | |
| 6,820,330 B1 | 11/2004 | Haba | |
| 6,962,279 B1 | 11/2005 | Marek et al. | |
| 6,992,026 B2 | 1/2006 | Fukuyo et al. | |
| 7,007,512 B2 | 3/2006 | Kamada et al. | |
| 7,023,001 B2 | 4/2006 | Cournoyer et al. | |
| 7,060,933 B2 | 6/2006 | Burrowes et al. | |
| 7,169,687 B2 * | 1/2007 | Li | B23K 26/0622 438/463 |
| 7,217,448 B2 | 5/2007 | Koyo et al. | |
| 7,232,612 B2 * | 6/2007 | Yamamoto | C03C 10/0009 428/426 |
| 7,378,342 B2 | 5/2008 | Kirby et al. | |
| 7,605,344 B2 | 10/2009 | Fukumitsu | |
| 7,723,212 B2 | 5/2010 | Yamamoto et al. | |
| 7,931,849 B2 * | 4/2011 | Patterson | B41M 5/24 257/E23.179 |
| 8,075,999 B2 | 12/2011 | Barefoot et al. | |
| 8,110,419 B2 * | 2/2012 | Zehavi | H01L 31/02165 438/22 |
| 8,134,099 B2 * | 3/2012 | Nakano | B23K 26/0057 219/121.69 |
| 8,383,983 B2 | 2/2013 | Lee et al. | |
| 8,584,354 B2 | 11/2013 | Cornejo et al. | |
| 8,609,512 B2 | 12/2013 | Pirogovsky et al. | |
| 8,635,887 B2 | 1/2014 | Black et al. | |
| 8,720,228 B2 | 5/2014 | Li | |
| 8,932,510 B2 | 1/2015 | Li et al. | |
| 9,018,562 B2 * | 4/2015 | Dantus | B23K 26/032 219/121.76 |
| 2001/0035447 A1 | 11/2001 | Gartner et al. | |
| 2001/0038930 A1 | 11/2001 | Yamamoto et al. | |
| 2001/0040150 A1 | 11/2001 | Suzuki et al. | |
| 2002/0005805 A1 | 1/2002 | Ogura et al. | |
| 2002/0033558 A1 | 3/2002 | Fahey et al. | |
| 2002/0037132 A1 * | 3/2002 | Sercel | B23K 26/0823 385/30 |
| 2002/0041946 A1 | 4/2002 | Abe | |
| 2002/0060978 A1 | 5/2002 | Hirotsune et al. | |
| 2003/0044539 A1 | 3/2003 | Oswald | |
| 2003/0071020 A1 * | 4/2003 | Hong | B23K 26/08 219/121.69 |
| 2003/0096078 A1 | 5/2003 | Horisaka et al. | |
| 2003/0102291 A1 | 6/2003 | Liu et al. | |
| 2003/0111447 A1 | 6/2003 | Corkum et al. | |
| 2003/0150839 A1 | 8/2003 | Kobayashi et al. | |
| 2003/0201261 A1 | 10/2003 | Kang et al. | |
| 2003/0217568 A1 | 11/2003 | Koyo et al. | |
| 2004/0002199 A1 * | 1/2004 | Fukuyo | B23K 26/0057 438/460 |
| 2004/0089644 A1 * | 5/2004 | Sekiya | H01L 21/78 219/121.72 |
| 2004/0104846 A1 | 6/2004 | Ogura et al. | |
| 2004/0128016 A1 * | 7/2004 | Stewart | G05B 19/4099 700/159 |
| 2004/0200067 A1 | 10/2004 | Ogura et al. | |
| 2005/0029240 A1 * | 2/2005 | Dugan | B23K 26/0063 219/121.82 |
| 2005/0042805 A1 | 2/2005 | Swenson et al. | |
| 2005/0064137 A1 * | 3/2005 | Hunt | B23K 26/006 428/131 |
| 2005/0087522 A1 | 4/2005 | Sun et al. | |
| 2005/0184035 A1 | 8/2005 | Kurosawa et al. | |
| 2005/0221044 A1 | 10/2005 | Gaume et al. | |
| 2005/0223744 A1 | 10/2005 | Horisaka et al. | |
| 2005/0230365 A1 * | 10/2005 | Lei | H01L 21/76898 219/121.71 |
| 2006/0021978 A1 | 2/2006 | Alexeev et al. | |
| 2006/0032842 A1 * | 2/2006 | Hiromatsu | B08B 7/0042 219/121.69 |
| 2006/0049156 A1 * | 3/2006 | Mulloy | B23K 26/123 219/121.71 |
| 2006/0091125 A1 | 5/2006 | Li et al. | |
| 2006/0127640 A1 | 6/2006 | Kobayashi et al. | |
| 2006/0151450 A1 | 7/2006 | You et al. | |
| 2006/0169677 A1 | 8/2006 | Deshi | |
| 2007/0012665 A1 | 1/2007 | Nelson et al. | |
| 2007/0039932 A1 | 2/2007 | Haase et al. | |
| 2007/0170162 A1 | 7/2007 | Haupt et al. | |
| 2007/0221826 A1 * | 9/2007 | Bechtel | G02B 3/005 250/208.1 |
| 2007/0231542 A1 * | 10/2007 | Deng | B08B 17/06 428/141 |
| 2007/0262464 A1 | 11/2007 | Watkins et al. | |
| 2007/0272666 A1 | 11/2007 | O'Brien et al. | |
| 2007/0272668 A1 | 11/2007 | Albelo et al. | |
| 2007/0291496 A1 | 12/2007 | Nashner et al. | |
| 2008/0047933 A1 | 2/2008 | Salminen et al. | |
| 2008/0050888 A1 | 2/2008 | Garner et al. | |
| 2008/0093775 A1 | 4/2008 | Menoni et al. | |
| 2008/0128953 A1 | 6/2008 | Nagai et al. | |
| 2008/0156780 A1 * | 7/2008 | Voronov | B41J 2/442 219/121.69 |
| 2008/0185367 A1 | 8/2008 | Ei-Hanany et al. | |
| 2008/0283509 A1 | 11/2008 | Abramov et al. | |
| 2008/0290077 A1 | 11/2008 | DeMeritt et al. | |
| 2008/0296273 A1 | 12/2008 | Lei et al. | |
| 2009/0020511 A1 | 1/2009 | Kommera et al. | |
| 2009/0045179 A1 | 2/2009 | Williams | |
| 2009/0201444 A1 | 8/2009 | Yamabuchi et al. | |
| 2009/0212030 A1 * | 8/2009 | Clifford, Jr. | B23K 26/046 219/121.72 |
| 2009/0224432 A1 | 9/2009 | Nagatomo et al. | |
| 2009/0242525 A1 | 10/2009 | O'Brien et al. | |
| 2010/0025387 A1 * | 2/2010 | Arai | B23K 26/0635 219/121.69 |
| 2010/0029459 A1 * | 2/2010 | Zwanziger | C03C 3/062 501/42 |
| 2010/0147813 A1 | 6/2010 | Lei et al. | |
| 2010/0197116 A1 | 8/2010 | Shah et al. | |
| 2010/0206008 A1 | 8/2010 | Harvey et al. | |
| 2010/0210442 A1 | 8/2010 | Abramov et al. | |
| 2010/0221583 A1 | 9/2010 | Foad et al. | |
| 2010/0243626 A1 | 9/2010 | Baldwin | |
| 2010/0285275 A1 * | 11/2010 | Baca | C03C 3/083 428/141 |
| 2010/0291353 A1 | 11/2010 | Dejneka et al. | |

(56) References Cited

U.S. PATENT DOCUMENTS

| | | | |
|---|---|---|---|
| 2010/0301024 A1 | 12/2010 | Unrath | |
| 2010/0320179 A1 | 12/2010 | Morita et al. | |
| 2011/0003619 A1 | 1/2011 | Fuji | |
| 2011/0049765 A1 | 3/2011 | Li et al. | |
| 2011/0115129 A1* | 5/2011 | Straw | B23K 26/03 264/400 |
| 2011/0127242 A1 | 6/2011 | Li | |
| 2011/0127244 A1 | 6/2011 | Li | |
| 2011/0183116 A1 | 7/2011 | Hung et al. | |
| 2011/0206903 A1* | 8/2011 | Mazumder | C03C 17/28 428/161 |
| 2011/0226832 A1 | 9/2011 | Bayne et al. | |
| 2011/0240611 A1 | 10/2011 | Sandström | |
| 2011/0240616 A1 | 10/2011 | Osako et al. | |
| 2011/0240617 A1* | 10/2011 | Xu | B23K 26/00 219/121.72 |
| 2011/0250423 A1 | 10/2011 | Fukasawa et al. | |
| 2011/0259631 A1 | 10/2011 | Rumsby | |
| 2011/0266264 A1 | 11/2011 | Rumsby | |
| 2011/0318996 A1 | 12/2011 | Okafuji et al. | |
| 2012/0052252 A1 | 3/2012 | Kohli et al. | |
| 2012/0061361 A1* | 3/2012 | Usuda | B23K 26/0057 219/121.85 |
| 2012/0135177 A1 | 5/2012 | Cornejo et al. | |
| 2012/0135195 A1* | 5/2012 | Glaesemann | B23K 26/073 428/156 |
| 2012/0145331 A1 | 6/2012 | Gomez et al. | |
| 2012/0168412 A1 | 7/2012 | Hooper | |
| 2012/0196071 A1* | 8/2012 | Cornejo | B28D 1/00 428/43 |
| 2012/0211923 A1 | 8/2012 | Gamer et al. | |
| 2013/0037992 A1* | 2/2013 | Milshtein | B23K 26/0608 264/400 |
| 2013/0129947 A1 | 5/2013 | Harvey et al. | |
| 2013/0155004 A1 | 6/2013 | Yoshikawa | |
| 2013/0192305 A1 | 8/2013 | Black et al. | |
| 2013/0221053 A1 | 8/2013 | Zhang | |
| 2013/0224439 A1 | 8/2013 | Zhang et al. | |
| 2013/0323469 A1 | 12/2013 | Abramov et al. | |
| 2013/0328905 A1 | 12/2013 | Iwata | |
| 2014/0093693 A1 | 4/2014 | Zhang et al. | |

FOREIGN PATENT DOCUMENTS

| | | |
|---|---|---|
| CN | 100471609 C | 3/2009 |
| CN | 101903301 A | 12/2010 |
| CN | 102356050 A | 2/2012 |
| CN | 102405520 A | 4/2012 |
| CN | 101670487 B | 1/2013 |
| DE | 10029110 B4 | 5/2006 |
| DE | 102006046313 B3 | 1/2008 |
| DE | 102007009786 A1 | 8/2008 |
| EP | 0321838 B1 | 2/1993 |
| EP | 2096375 A1 | 2/2009 |
| EP | 2371778 A1 | 5/2011 |
| JP | 1998128563 A | 5/1998 |
| JP | 11-163403 A | 6/1999 |
| JP | 2001-274441 | 5/2001 |
| JP | 2002-192369 A | 7/2002 |
| JP | 2002192369 A | 7/2002 |
| JP | 200388976 A | 3/2003 |
| JP | 2004-299969 A | 10/2004 |
| JP | 2005-81715 A | 3/2005 |
| JP | 2005088023 A | 4/2005 |
| JP | 2005144530 A | 6/2005 |
| JP | 2007-283318 A | 11/2007 |
| JP | 2007-319881 A | 12/2007 |
| JP | 2007319881 A | 12/2007 |
| JP | 2009-61462 A | 3/2009 |
| JP | 2009-72829 A | 4/2009 |
| JP | 2009280452 A | 12/2009 |
| JP | 2010142862 A | 7/2010 |
| JP | 2011-88179 A | 5/2011 |
| JP | 2011-517299 A | 6/2011 |
| JP | 2011-164508 A | 8/2011 |
| JP | 2011-230940 A | 11/2011 |
| JP | 2011-251879 A | 12/2011 |
| JP | 2012-031018 A | 2/2012 |
| JP | 2012096257 A | 5/2012 |
| JP | 2013-043795 A | 3/2013 |
| KR | 10-2010-0031462 A | 3/2010 |
| KR | 10-2012-0015366 A | 2/2012 |
| TW | 200631718 A | 9/2006 |
| TW | 201132604 A | 10/2011 |
| WO | WO2002022301 A1 | 3/2002 |
| WO | WO 03/002289 A1 | 1/2003 |
| WO | WO2008/108332 A1 | 9/2008 |
| WO | WO 2009/106582 A2 | 9/2009 |
| WO | WO 2010/096359 A1 | 8/2010 |
| WO | WO2011/025903 A1 | 3/2011 |
| WO | WO 2011/025903 A1 | 3/2011 |
| WO | WO2011/025908 A1 | 3/2011 |
| WO | WO 2011/025908 A1 | 3/2011 |
| WO | WO2011117006 A1 | 9/2011 |

OTHER PUBLICATIONS

International Search Report of PCT/US2013/061212, 5 pages.
Written Opinion of PCT/US2013/061212, 10 pages.
Bradley Elkins Riley, "Evporative Etching for Non-Contact Glass Scribing Using a Single-Mode Ytterbium Fiber Laser", North Carolina State University, 2007, 96 pages.
J. Zhang et al., "High-Speed Machining of Glass Materials by Laser-Induced Plasma-Assisted Ablation Using a 532-nm Laser", Appl. Phys. A 67, 499-501, 1998.
Kunihito Nagayama et al. (2011), Pulse Laser Ablation by Reflection of Laser Pulse at Interface of Transparent Materials, Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-byreflection-of-laser-pulse-at-interface-of-transparent-materials.
Y. Hanada et al., "Laser-Induced Plasma-assisted Ablation (LIPAA): Fundamental and Industrial Applications", High-Power Laser Ablation VI, Proc. of SPIE vol. 6261, 626111-1 to -15 (2006).
Loeschner, U., et al. "Micromachining of glass with short ns-pulses and highly repetitive fs-laser pulses." Proceedings of the ICALEO. 2008. 9 pages.
Beat Neuenschwander et al., "Processing of Metals and Dielectric Materials with PS-Laserpulses: Results, Strategies, Limitations and Needs" Proc. SPIE 7584, Laser Applications in Microelectronic and Optoelectronic Manufacturing XV, 75840R (Feb. 17, 2010); 14 pages.
M B Strigin, A N Chudinov, "Laser Processing of Glass by Picosecond Pulses", Quantum Electronics 24 (8) 732-735 (1994).
Anatoli A. Abramov et al., "Laser Separation of Chemically Strengthened Glass" Physics Procedia 5 (2010), 285-290.
English translation of the Aug. 17, 2015 Office action concerning Chinese Patent Application No. 200980153523.7, which corresponds with the subject U.S. Appl. No. 12/336,609.
Thomas Paul Dumont et al., "Laser Interaction With Materials: From Transparent Materials to Thin Films", 2006, 162 Pages.
Lawrence Shah et al., "Femtosecond Laser Deep Hole Drilling of Silicate Glasses in Air", applied Surface Science, 2001, p. 151-164.
Rabia Qindeel et al., "IR Laser Plasma Interaction With Glass", American Journal of Applied Science 4 (12), 2007, pp. 1009-1015.
English translation of the Mar. 3, 2016 Office action concerning Chinese Patent Application No. 201380009726.5, which corresponds with U.S. Appl. No. 138779,050.
English translation of the Feb. 22, 2016 Office action concerning Chinese Patent Application No. 200980153523.7, which corresponds with the subject U.S. Appl. No. 12/336,609.
English translation of the Mar. 17, 2016 Office action concerning Chinese Patent Application No. 201380049563.3, which corresponds with the subject U.S. Appl. No. 14/033,368.
English translation of the Jun. 17, 2016 Office action concerning Chinese Patent Application No. 201380009631.3, which corresponds with the U.S. Appl. No. 13/778,950.

(56) References Cited

OTHER PUBLICATIONS

English translation of the Jul. 20, 2016 Office action concerning Chinese Patent Application No. 201380009726.5, which corresponds with the U.S. Appl. No. 13/779,050.
English translation of the Aug. 1, 2016 Office action concerning Chinese Patent Application No. 201380009749.6, which corresponds with the U.S. Appl. No. 13/779,183.
English translation of the Aug. 30, 2016 Office action concerning Taiwan Patent Application No. 102107470, which corresponds with the U.S. Appl. No. 13/779,183.
English translation of the Feb. 7, 2017 Office action concerning Japanese Patent Application No. 2014-559964,which corresponds with the subject U.S. Appl. No. 13/778,950, 4pages.
English translation of the Apr. 19, 2017 Office action concerning Chinese Patent Application No. 2013-80009631.3, which corresponds with the subject U.S. Appl. No. 13/778,950, 11 pages.
English translation of the Mar. 7, 2017 Office action concerning Japanese Patent Application No. 2014-559989, which corresponds with related U.S. Appl. No. 13/779,183, 3 pages.
English translation of the May 25, 2017 Office action concerning Taiwan Patent Application No. 102134208.
English translation of the Jun. 27, 2017 Office action concerning Japanese Patent Application No. 2015-533250.

\* cited by examiner

METHOD AND APPARATUS FOR MACHINING A WORKPIECE

CROSS-REFERENCE TO RELATED APPLICATIONS

This application is a Non-Provisional application claiming the benefit of U.S. Patent Provisional Application Ser. No. 61/705,559, which was filed on 25 Sep. 2012, and U.S. Provisional Application No. 61/705,038, filed 24 Sep. 2012, which are hereby incorporated by reference in its entirety.

BACKGROUND

Embodiments of the present invention relate generally to methods and apparatus for machining workpieces and, more specifically, to methods for reliably and consistently machining workpieces with a laser.

When using a laser to do machine transparent materials according to non-linear absorption processes, there are times where the initial processing of the material is inconsistent. This inconsistent initial machining can undesirably lead to cut profiles that are rough, with nubs of material protruding into the machined features, features clogged with debris, or even workpiece cracking during the machining.

DETAILED DESCRIPTION OF THE ILLUSTRATED EMBODIMENTS

Embodiments of the present invention are described more fully hereinafter with reference to the accompanying drawings, in which example embodiments of the invention are shown. These embodiments may, however, be implemented in many different forms and should not be construed as limited to the embodiments set forth herein. Rather, the embodiments are provided so that this disclosure will be thorough and complete, and will fully convey the scope of the invention to those skilled in the art. In the drawings, the shapes, sizes and relative sizes of layers, regions, components, etc., may be exaggerated for clarity. Unless otherwise specified, a range of values, when recited, includes both the upper and lower limits of the range, as well as any sub-ranges there between.

Figure 1A:
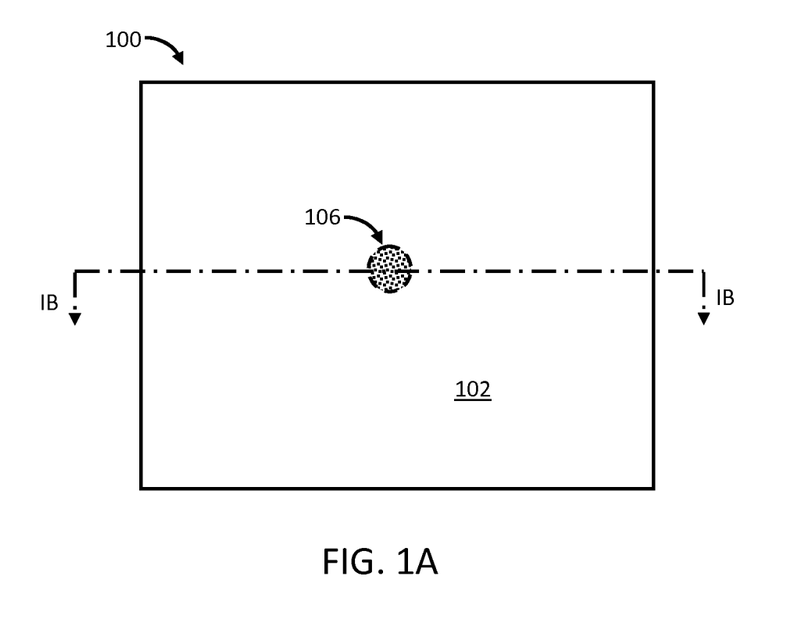
FIG. 1A illustrates a top plan view of a workpiece having an exterior surface with a region that has been processed to facilitate subsequent machining of the workpiece.
Figure 1B:
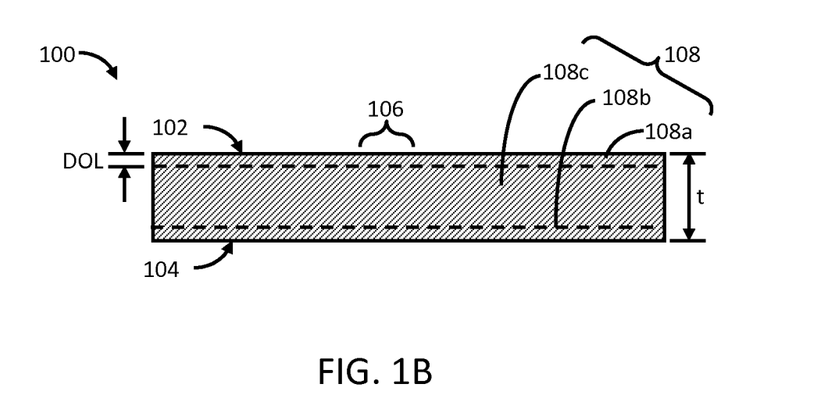
FIG. 1B illustrates a cross-section view of the workpiece shown in FIG. 1A, taken along line IB-IB.

Referring to FIGS. 1A and 1B, a workpiece 100 includes an exterior surface having a first major surface region 102, a second primary surface region 104 opposite the first major surface region 102, and one or more side surface regions extending from the first major surface region 102 to the second major surface region 104. In the illustrated embodiment, the first major surface region 102 and the second major surface region 104 are both substantially flat and parallel to one another. Accordingly, the distance from the first major surface region 102 and the second major surface region 104 can define the thickness, t, of the workpiece 100. In one embodiment, the thickness of the workpiece 100 is in a range from 200 µm to 10 mm. In another embodiment, however, the thickness of the workpiece 100 can be less than 200 µm or greater than 10 mm. In yet another embodiment, the first major surface region 102 and the second major surface region 104 may not be substantially flat, may not be parallel to one another, or a combination thereof.

Generally, the workpiece 100 is formed of a hard optical material such as corundum, a ceramic, a semiconductor, a metal or metal alloy, a glass, a glass-ceramic, or the like or a combination thereof. Exemplary ceramic materials from which the workpiece 100 can be formed include alumina, beryllia, zirconia, or the like or a combination thereof. Exemplary semiconductor materials from which the workpiece 100 can be formed include Group IV elemental or compound semiconductors (e.g., silicon, germanium, silicon-germanium, silicon carbide, or the like or a combination thereof), III-V compound semiconductors, II-VI compound semiconductors, II-V compound semiconductors, I-VII compound semiconductors, IV-VI compound semiconductors, semiconductor oxides, or the like, or a combination thereof. Exemplary metals and metal alloys from which the workpiece 100 can be formed include aluminum, titanium, stainless steel, or the like, or alloys or other combinations thereof. Exemplary glasses from which the workpiece 100 can be formed include soda-lime glass, borosilicate glass, aluminosilicate glass, aluminoborosilicate glass, sodium-aluminosilicate glass, calcium-aluminosilicate glass, phosphate glass, fluoride glass, chalcogenide glass, bulk metallic glass, or the like, or a combination thereof.

In one embodiment, the workpiece 100 is provided as a plate, sheet, substrate, etc., of glass (e.g., soda-lime glass, borosilicate glass, aluminosilicate glass, aluminoborosilicate glass, sodium-aluminosilicate glass, calcium-aluminosilicate glass, etc.) which may be unstrengthened, thermally strengthened, chemically strengthened, or the like. When the glass workpiece is strengthened, each of the first major surface region 102 and the second major surface region 104 can be compressively stressed while a region in the interior of the sheet of glass is in a state of tension to compensate for the surface compression at the first major surface region 102 and the second major surface region 104. Thus, the sheet of strengthened glass can be characterized as including a pair of compression regions (i.e., regions where the glass is in a state of compression), such as regions compression regions 108a and 108b, extending from the first major surface region 102 and the second major surface region 104 and separated by a central tension region (i.e., a region where the glass is in a state of tension) such as tension region 108c. The thickness of a compression region 108a or 108b is known as the "depth of layer" (DOL).

Generally, the surface compression at each of the first major surface region 102 and the second major surface region 104 can be in a range from 69 MPa to 1 GPa. In other embodiments, however, the surface compression at any of the first major surface region 102 or second major surface region 104 can be less than 69 MPa or greater than 1 GPa. Generally, the DOL can be in a range from 20 µm to 100 µm. In other embodiments, however, the DOL can be less than 20

μm or greater than 100 μm. The maximum tensile stress of the sheet within the tension region can be determined by the following formula:

$$CT = \frac{CS \times DOL}{t - 2 \times DOL}$$

where CS is the aforementioned surface compression at the first major surface region 102 and second major surface region 104, t is the thickness of the sheet of glass (expressed in millimeters, mm), DOL is the depth of layer of the compression region(s) (expressed in mm), and CT is the maximum central tension within the sheet of glass (expressed in MPa).

Having exemplarily described a workpiece 100 capable of being machined according to embodiments of the present invention, exemplary embodiments of machining the workpiece 100 will now be described. Upon implementing these methods, the workpiece 100 can be reliably and repeatably laser-machined (e.g., by directing laser energy onto the workpiece 100) to form features such as blind holes, through holes, openings, slots, cracks, and the like (collectively referred to herein as "features"). Generally, however, the workpiece 100 is laser-machined using laser light having a wavelength to which the workpiece 100 is at least substantially transparent. Thus, interactions between the laser light and material of the workpiece 100 during the laser-machining can typically be characterized as those involving non-linear absorption of laser energy by the workpiece material.

Referring to FIGS. 1A and 1B, the workpiece 100 is first subjected to a pre-machining enhancement process configured to facilitate subsequent laser-machining of the workpiece 100. In one embodiment, the pre-machining enhancement process facilitates subsequent laser-machining of the workpiece 100 by enhancing the uniformity of non-linear absorption of laser energy that is directed onto the workpiece 100 upon initiating the laser-machining process. Upon performing one or more pre-machining enhancement processes, an enhancement region 106 is formed at a portion of the exterior surface of the workpiece 100. Although the enhancement region 106 is illustrated as occupying only a portion of the first major surface region 102, it will be appreciated that the enhancement region 106 may occupy all of the first major surface region 102, and may further occupy all or part of any the second major surface region 104 as well as any of the side surface regions. Although FIGS. 1A and 1B illustrate only one enhancement region 106, it will be appreciated that any number of discrete enhancement regions 106 may be provided.

The pre-machining enhancement process can include generating free electrons at a region of the exterior surface of the workpiece 100 (e.g., at an enhancement region 106 of the exterior surface), creating defects within the enhancement region 106 of the exterior surface, modifying a composition of at least a portion of exterior surface within the enhancement region 106, modifying the surface morphology of at least a portion of exterior surface within the enhancement region 106, or the like or a combination thereof. It will be appreciated that selection of the particular pre-machining enhancement process to be performed and the characteristics of the selected pre-machining enhancement process will depend on the material within the enhancement region 106 and the characteristics of the subsequent laser-machining process used to form a desired feature.

In one embodiment, one or more of any of the aforementioned pre-machining enhancement processes may be performed by introducing negatively charged ions (atomic or molecular) into the exterior surface, or into the interior 108 of the workpiece 100. The ions may be introduced by any suitable method including, for example, ion implantation, diffusion (e.g., from a liquid or a gas), or the like or a combination thereof.

In one embodiment, the surface morphology of the workpiece 100 may be modified by forming one or more cracks within the exterior surface of the workpiece 100, by chemically etching at least a portion of the exterior surface of the workpiece 100, by sputter etching at least a portion of the exterior surface of the workpiece 100, by mechanically abrading at least a portion of the exterior surface of the workpiece 100, or the like or a combination thereof. For example, one or more cracks may be formed by mechanically impacting the exterior surface of the workpiece 100 at a location within or near the enhancement region 106 (e.g., with a cutting or scribing blade, or the like), by generating thermally-induced tensile and/or compressive stresses at a location within or near the enhancement region 106, by subjecting the workpiece 100 to a bending moment or other physical stress, by generating a region of laser-induced optical breakdown at a location within or near the enhancement region 106, or the like or a combination thereof. In another example, the chemical etching may involve a wet etching process, a dry etching process, or the like or a combination thereof, where the particular etchant used may depend on the material forming the enhancement region 106 and the desired change in surface morphology. In embodiments in which the workpiece 100 is formed of unstrengthened or strengthened glass, the etchant may include hydrofluoric acidic, HNA (hydrofluoric acid/nitric acid/acetic acid), or the like or a combination thereof. In another example, the sputter etching may involve any etching process involving momentum transfer between accelerated ions (either inert or reactive) and the workpiece 100. In another example, the mechanical abrading may involve any scuffing, scratching, wearing down, marring, rubbing away, or abrasive blasting (e.g., wet abrasive blasting, bead blasting, dry ice blasting, bristle blasting, or the like or a combination thereof), or the like or a combination thereof.

In another embodiment, the surface morphology of at least a portion of the exterior surface of the workpiece 100 may be modified by directing an energy beam onto at least a portion of the exterior surface. Examples of energy beams that may be directed in accordance with this embodiment include electron beams, ion beams, laser beams, or the like or a combination thereof.

Depending on the specific processes applied, the surface roughness of at least a portion of the exterior surface of the workpiece 100 may be desirably increased upon modifying the surface morphology of at least the portion of the exterior surface of the workpiece 100. It will be appreciated that the desired roughness to facilitate subsequent laser-machining can also depend upon the material from which the workpiece 100 is formed, the particular feature to be machined, the characteristics of the laser-based machining process, or the like or a combination thereof. For example, in embodiments in which the workpiece is formed of unstrengthened soda-lime glass, it is desirable for the enhancement region 106 to have an Ra (avg) surface roughness value in a range between 2.0 μm and 9.0 μm, or an Rq (rms) surface roughness value in a range between 4.0 μm and 11.0 μm. Of course, the Ra and Rq values for the enhancement region 106 may be higher than 9.0 μm and 11.0 μm, respectively, if desired.

Results of experiments by the inventors tend to indicate that the quality of laser-machined features increases as the surface roughness at the enhancement region 106 increases. Generally, a relatively high-quality laser-machined feature will be associated will have relatively fewer and/or smaller surface chips (e.g., having, on average, a size of less than 40 µm, less than 30 µm, or less than 20 µm) in the exterior surface of the workpiece 100 surrounding the laser-machined feature than a relatively low-quality laser-machined feature.

In embodiments in which the workpiece is formed of strengthened or unstrengthened glass, the enhancement region 106 can be formed to have a desirable, consistent surface roughness when a laser beam is used to form the enhancement region 106 during the pre-machining enhancement process. Parameters of the laser beam can be selected and controlled so that the laser beam irradiates a spot on the exterior surface of the workpiece 100 with laser energy having an intensity of over $10^{12}$ W/cm$^2$. Generally, parameters of the laser beam such as wavelength, pulse duration, pulse repetition rate, power, spot size, scan rate, can be selected and controlled as desired to achieve uniform surface roughening within the enhancement region 106. The wavelength of the laser beam can be in a range from 100 nm to 3000 nm (e.g., 355 nm, 532 nm, 1064 nm, or the like or a combination thereof). The pulse duration of the laser beam can be less than 1 ns (or less than about 1 ns). In one embodiment, the pulse duration of the laser beam can be less than 100 ps. In another embodiment, the pulse duration of the laser beam can be in a range from 10 ps to 15 ps. The pulse repetition rate of the laser beam can be in a range from 30 kHz to 1 MHz. In one embodiment, the pulse repetition rate of the laser beam can be in a range from 30 kHz to 500 kHz. In yet another embodiment, the pulse repetition rate of the laser beam can be 200 kHz. The spot size of the laser beam can be in a range from 3 µm to 50 µm. In one embodiment, the spot size of the laser beam can be 7 µm. Depending on the pulse repetition rate and spot size, the average power of the laser beam can be in a range from 0.5 W to 75 W. In one embodiment, the average power of the laser beam can be 2 W. Depending on the average power and spot size, the scan speed of the laser beam can be in a range from 100 mm/s to 5000 mm/s. In one embodiment, the scan speed of the laser beam can be 140 mm/s. One or more of the aforementioned laser beam parameters can be selected and controlled so that the laser beam irradiates the exterior surface of the workpiece at a pitch in a range from about 50% to about 70% of the spot size.

Having exemplarily described various embodiments of performing a pre-machining enhancement process, some exemplary pre-machining enhancement processes will now be described with reference to FIGS. 2 and 4.

Figure 2:
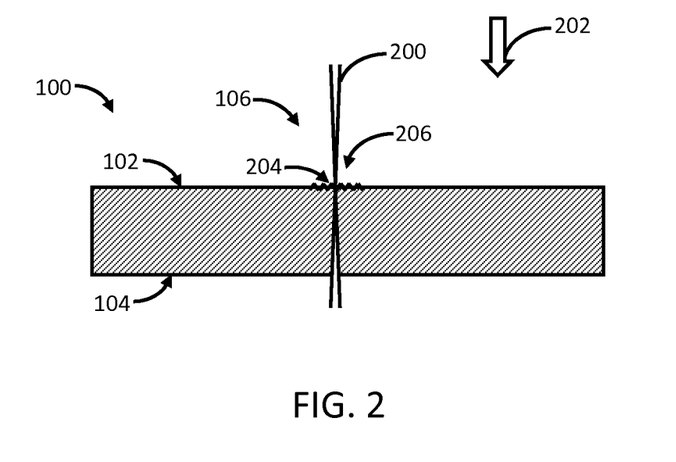
FIGS. 2 to 4 illustrate exemplary embodiments of a pre-machining enhancement process.

Referring to FIG. 2, a pre-machining enhancement process can be performed, according to one embodiment, by directing a laser beam 200 from a laser system (not shown) onto the exterior surface of the workpiece 100 along the direction indicated by arrow 202. In the illustrated embodiment, the workpiece 100 is oriented relative to the laser system (not shown) such that the laser beam 200 impinges the first major surface region 102 at the enhancement region 106. The laser beam 200 may be focused at a beam waist 204 located either at or above the first major surface region 102 (e.g., so as to be located outside the workpiece 100) so that the laser beam 200 irradiates a spot at a portion of the first major surface region 102 with laser energy having a peak intensity sufficient to modify (e.g., increase) the surface roughness of the workpiece surface irradiated by the laser beam 200, thereby creating a roughened surface 204 within the enhancement region 106. Parameters of this pre-machining enhancement process can be controlled to ensure that the roughened surface has a desired surface roughness. In one embodiment, the laser beam 200 may be scanned and/or the workpiece 100 may be translated to cause the spot to be moved along the exterior surface of the workpiece 100 within the enhancement region 106.

In one example embodiment, the aforementioned pre-machining enhancement process was performed by providing the workpiece as a piece of unstrengthened soda-lime glass and the laser 200 directed 10 ns pulses of green light onto the first major surface 102. The resultant roughened surface had surface roughness values of 8.5 µm (Ra) and 10.6 µm (Rq).

Figure 3:
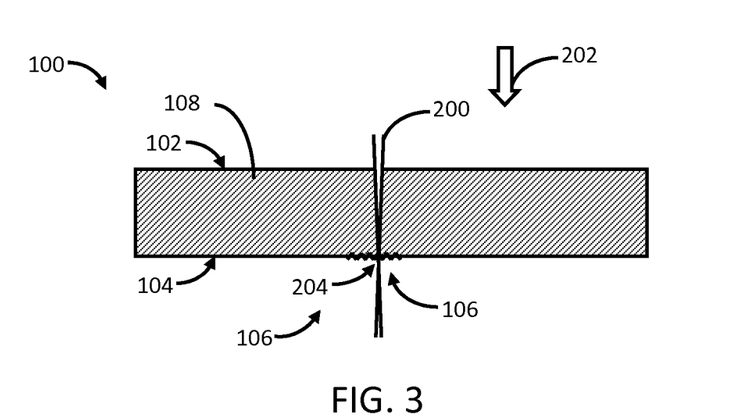

Referring to FIG. 3, a pre-machining enhancement process according to another embodiment can be performed as exemplarily described with respect to FIG. 2. In the embodiment shown in FIG. 3, however, the laser beam 200 may be directed (e.g., along the direction indicated by arrow 202) onto the workpiece 100 such that the laser beam 200 first impinges the first major surface region 102 and is then transmitted through the workpiece 100. In the illustrated embodiment, the laser beam 200 is focused at a beam waist 204 located either at or below the second major surface region 104 (e.g., so as to be located outside the workpiece 100) so that the laser beam 200 irradiates a spot at a portion of the second major surface region 104 with laser energy having a peak intensity sufficient to modify (e.g., increase) the surface roughness of the workpiece surface irradiated by the laser beam 200, thereby creating the roughened surface 204 at an enhancement region 106 located at the second major surface region 104.

Figure 4:
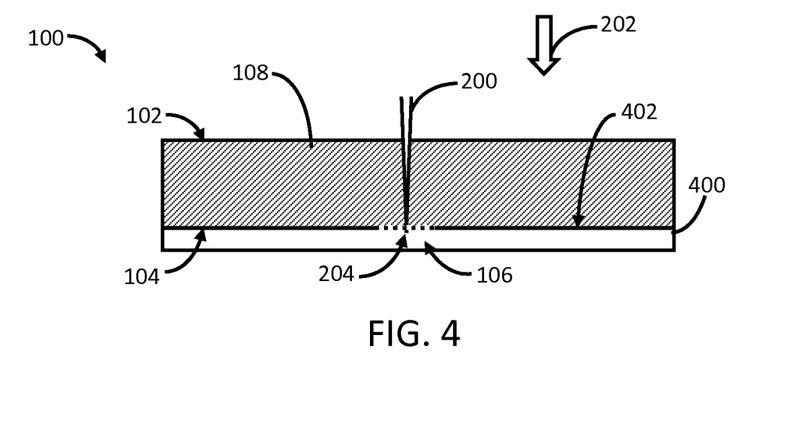

Referring to FIG. 4, a pre-machining enhancement process according to another embodiment can be performed in a similar manner as described with respect to FIG. 3. In the embodiment shown in FIG. 4, however, a donor object 400 may be disposed adjacent to the second major surface region 104 (e.g., such that a donor surface 402 of the donor object 400 abuts the second major surface region 104). In another embodiment, however, the donor object 400 can be disposed adjacent to the second major surface region 104 so the donor surface 402 is spaced apart from the second major surface region 104 (e.g., by a distance of 1 mm). In one embodiment, the donor object 400 is a metallic object, and may include a metal such as aluminum or the like, a metal alloy such as an aluminum alloy, stainless steel, or the like or a combination thereof.

The laser beam 200 may be directed (e.g., along the direction indicated by arrow 202) onto the workpiece 100 such that the laser beam 200 first impinges the first major surface region 102 and this then transmitted through the workpiece 100 and through the second major surface region 104 to impinge upon the donor object 400. The laser beam 200 may be focused at a beam waist 204 located either at or below the second major surface region 104 (e.g., so as to be located outside the workpiece 100) or so that the laser beam 200 irradiates a spot at a portion of the donor object 400 with laser energy having a laser fluence and/or peak intensity sufficient to ablate, vaporize, ionize, boil, eject, free, or otherwise remove donor material (e.g., electrons, atoms, molecules, particles, etc.) from the from the donor object 400. In one embodiment, the removal of donor material is effected such that the removed donor material impacts against, is implanted into, is diffused through, or is otherwise introduced to an enhancement region 106 at the second major surface region 104 of the exterior surface of the workpiece 100. Upon introducing the donor material to the enhancement region 106 at the second major surface region 104, one or more or all of the aforementioned pre-machining enhancement processes (e.g., generating free electrons at the enhancement region 106, creating defects within the enhancement region 106, modifying a composition of at least a portion of exterior surface within the enhancement region 106, modifying the surface morphology of at least a portion of exterior surface within the enhancement region 106, etc.) may be performed.

After performing a pre-machining enhancement process according to one or more of the embodiments discussed above, the workpiece 100 may be machined (e.g., in a laser-machining process) by directing laser energy onto the workpiece 100 in such a manner as to machine (e.g., crack, remove, or the like or a combination thereof) a portion within the interior 108 of the workpiece 100 that adjoins the enhancement region 106. In one embodiment, the portion within the interior 108 of the workpiece 100 is removed to form a feature such as a through-hole, a blind-hole, or the like or a combination thereof.

In one embodiment, laser-machining of the workpiece 100 can include directing laser energy (e.g., in the form of a beam of one or more laser pulses) onto the workpiece 100. Laser energy within the beam can have a wavelength to which the workpiece 100 is at least substantially transparent. The one or more pulses can be directed to irradiate a spot at the enhancement region 106, formed during the pre-machining enhancement process, with laser energy having a laser fluence and/or peak intensity sufficient to stimulate non-linear absorption of the laser energy by the workpiece 100. In one embodiment, the non-linear absorption includes avalanche-dominated absorption of the laser energy by the workpiece 100. In one embodiment, the one or more laser pulses directed onto the workpiece 100 during the laser-machining may have a pulse duration in a range from 10 fs to 500 ns and at least one wavelength in a range from 100 nm to 3000 nm. Generally, the pulse duration of the one or more pulses directed onto the workpiece 100 during the laser-machining may be the same as or different from the pulse duration of the at least one laser pulse of the laser beam directed during the pre-machining enhancement process. Similarly, the wavelength of the one or more pulses directed onto the workpiece 100 during the laser-machining may be the same as or different from the wavelength of the at least one laser pulse of the laser beam directed during the pre-machining enhancement process. In one specific embodiment, the one or more laser pulses directed onto the workpiece 100 during the laser-machining may have a pulse duration of 10 ns and a wavelength in the green light range (e.g., about 523 nm, 532 nm, 543 nm, or the like or a combination thereof). In one embodiment, the laser energy is directed onto the workpiece 100 during the laser-machining process as a beam having a plurality of pulses, wherein the pulse duration of at least one of the pulses can be the same as or different from the pulse duration of at least one of the other pulses.

Having exemplarily described various embodiments of laser-machining the workpiece 100, an exemplary method of laser-machining the workpiece 100 will now be described with reference to FIGS. 5 to 8.

Figure 5:
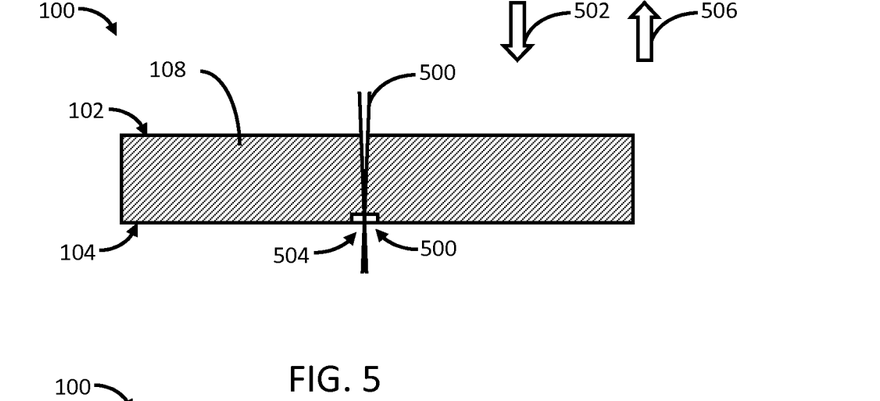
FIGS. 5 to 8 illustrate one embodiment of a method of machining a feature within the workpiece shown in FIGS. 1A and 1B after performing a pre-machining enhancement process as illustrated in FIG. 3.

Referring to FIG. 5, a workpiece 100, having been previously subjected to a pre-machining enhancement process as discussed above with respect to FIG. 3, may be provided and laser energy (e.g., in the form of a beam 500 of at least one laser pulse) may be directed onto the workpiece 100 from a laser system (not shown) along the direction indicated by arrow 502. In the illustrated embodiment, the workpiece 100 is oriented relative to the laser system such that the beam 500 first impinges the first major surface region 102 and is then transmitted through the workpiece 100. In the illustrated embodiment, the laser beam 500 is focused at a beam waist 504 located either at or below the second major surface region 104 (e.g., so as to be located outside the workpiece 100) so that the beam 500 irradiates a spot at the enhancement region 106 (see FIG. 3) with laser energy having a laser fluence and/or peak intensity sufficient to stimulate non-linear absorption of the laser energy by the workpiece 100 at the enhancement region 106.

Upon stimulating non-linear absorption of the laser energy, a portion of the workpiece 100 adjoining the enhancement region 106 at the exterior surface of the workpiece 100 may be laser-machined (e.g., cracked, removed, or the like or a combination thereof). In the illustration, however, the portion of the workpiece 100 adjoining the enhancement region 106 is removed to form a preliminary feature 504. In one embodiment, the beam 500 may be scanned and/or the workpiece 100 may be translated to cause the spot to be moved along the exterior surface of the workpiece 100 within the enhancement region 106 to ensure that the preliminary feature 504 has a desired shape.

Figure 6:
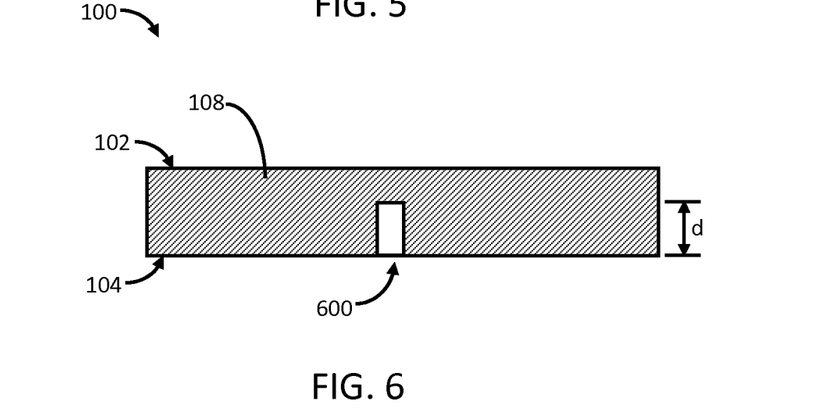
Figure 7:
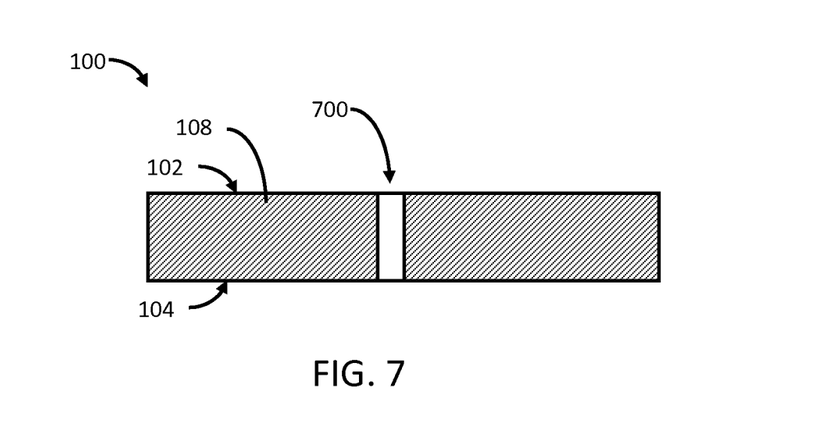

After forming the preliminary feature 504, the laser system may be controlled to move the beam waist 504 along the direction indicated by arrow 506 to be at or below a new workpiece surface created upon formation of the preliminary feature 504 to laser-machine the new workpiece surface. The process of moving the beam waist and laser-machine new workpiece surfaces can be repeated as desired to form a blind-hole (e.g., blind-hole 600 extending to any depth, d, into the workpiece 100, as shown in FIG. 6), a through-hole (e.g., through-hole 700 extending completely through the thickness of the workpiece 100, as shown in FIG. 7), or the like or a combination thereof.

Figure 8:
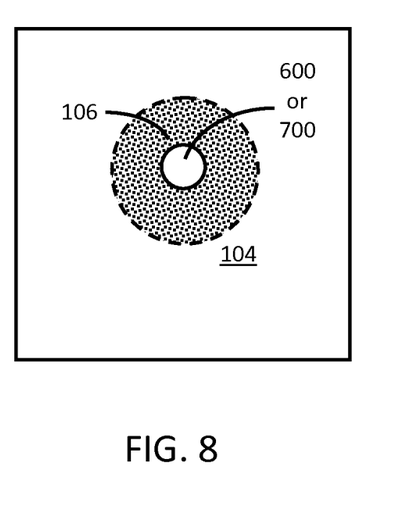

As shown in FIG. 8, the feature (e.g., the blind-hole 600 or the through-hole 700) ultimately formed within the workpiece 100 may have an opening that intersects the exterior surface of the workpiece 100 (e.g., the second major surface portion 104) within the enhancement region 106. In one embodiment, the area of the opening may be less than the area of the enhancement region 106 (as illustrated), or may be equal to (or substantially equal to) the area of the enhancement region 106. Although FIG. 8 illustrates the workpiece 100 as having been laser-machined to form only one feature intersecting the enhancement region 106 of the exterior surface of the workpiece 100, it will be appreciated that multiple discrete features may intersect the enhancement region 106 (e.g., as shown in FIG. 9).

Figure 9:
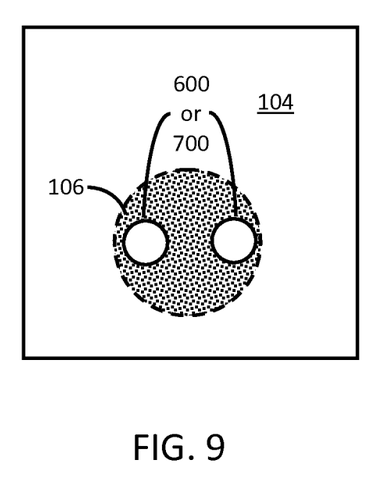
FIG. 9 illustrates an exemplary spatial relationship between machined features and the processed region of the exterior surface of the workpiece, according to some embodiments.

Although FIGS. 8 and 9 illustrate feature openings intersecting the enhancement region 106 which are circular in shape, it will be appreciated that the feature openings may be of any shape (e.g., elliptical, irregular, triangular, rectangular, etc.). Moreover, the features may have relatively small dimensions and remain unclogged by undesirable post-machining debris or other unprocessed material.

Although FIGS. 5 to 9 illustrate some embodiments of a laser-machining process in which the enhancement region 106 has been formed at the second major surface region 104 of the workpiece 100, it will be appreciated that the above-described laser-machining process can be performed on a workpiece having an enhancement region 106 formed at the first major surface region 102. In such an embodiment, the workpiece 100 can simply be flipped over (e.g., such that the first major surface region 102 is disposed below the second major surface region) so that the beam 500 travels through the workpiece 100 before irradiating the enhancement region 106. Further, it will also be appreciated that the workpiece 100 may be subjected to a laser-machining process as exemplarily described in U.S. patent application Ser. No. 13/779,183.

Upon forming one or more features, such as features 600 or 700, the workpiece can be characterized as an article. When the workpiece 100 is provided as a piece of strengthened glass, the article can be used as a protective cover plate for display and touch screen applications such as, but not limited to, portable communication and entertainment devices such as telephones, music players, video players, or the like; and as a display screen for information-related terminals (IT) (e.g., portable computer, laptop computer, etc.) devices; as well as in other applications.

Figure 10:
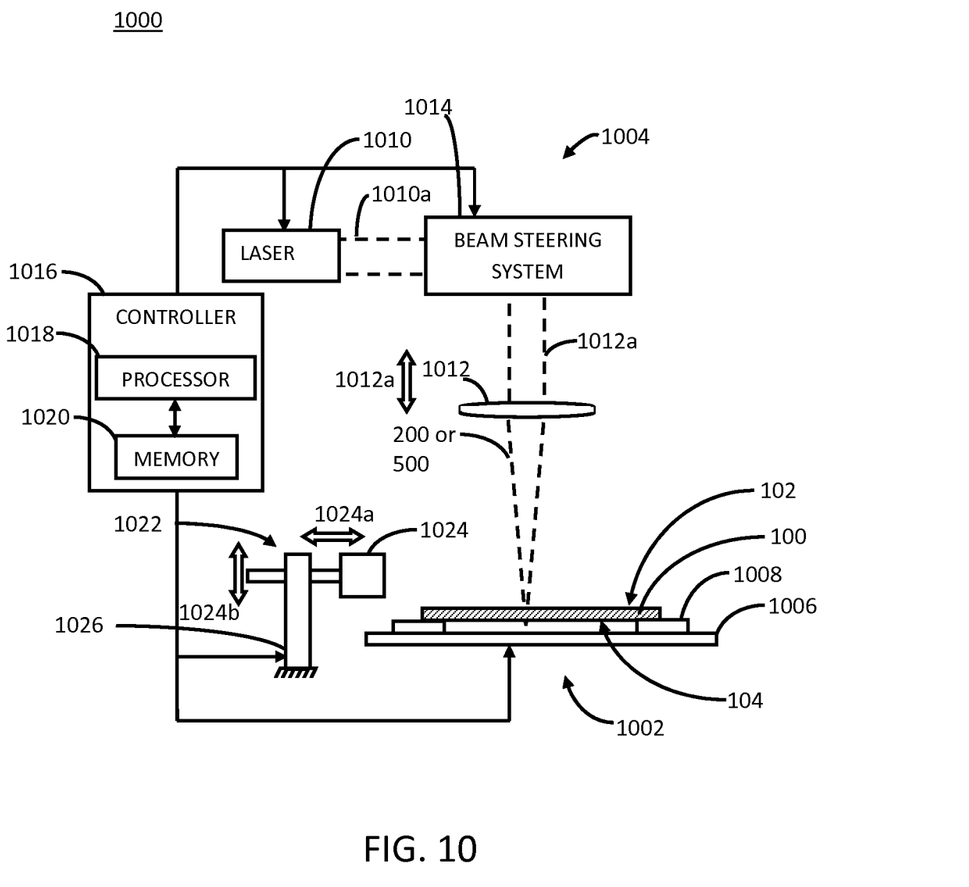
FIG. 10 illustrates an exemplary apparatus for machining a workpiece, according to one embodiment.

It will be appreciated that any article exemplarily described above may be formed using any desired apparatus. FIG. 10 schematically illustrates one embodiment of an apparatus configured to perform the processes exemplarily described with respect to FIGS. 1A-9.

Referring to FIG. 10, an apparatus, such as apparatus 1000, can machine a workpiece such as workpiece 100. The apparatus 100 may include a workpiece support system 1002 and a laser system 1004.

Generally, the workpiece support system 1002 is configured to support the workpiece 100 such that the first major surface region 102 faces toward the laser system 1004 and such that the beam waist 204 or 504. As exemplarily illustrated, the workpiece support system 1002 can include a chuck such as chuck 1006 configured to support the workpiece 100 and one or more movable stages (not shown) configured to move the chuck 1006 (e.g., in an x-direction, a y-direction, a z-direction, a Θ-direction, or the like or a combination thereof). As illustrated, a support frame 1008 may be disposed between the chuck 1006 and the workpiece 100 (e.g., so the second major surface region 104 can be suspended away from the chuck 1006). Depending on how close the second major surface region 104 is spaced apart from the chuck 1006, the chuck 1006 can function as the aforementioned donor object 400. In another embodiment, the support frame 1008 can be omitted so the second major surface region 104 of the workpiece 100 can contact the chuck 1006. In such an embodiment, the chuck 1006 can function as the aforementioned donor object 400.

Generally, the laser system 1004 is configured to direct a beam such as the beam 500 and, optionally, the laser beam 200 along an optical path (wherein the beam 202 has a beam waist as exemplarily described above with respect to beam waist 504 and, optionally 204). As exemplarily illustrated, the laser system 1004 may include a laser 1010 configured to produce a beam 1010*a* of laser light and an optical assembly 1012 configured to focus the beam 1010*a* to produce the beam 500 (having beam waist 504) and, optionally laser beam 200 (having beam waist 204). The optical assembly 1012 may include a lens and may be movable along a directions indicated by arrow 1012*a* to change the location of the beam waist (e.g., along a z-direction) relative to the workpiece 100. The laser system 1004 may further include a beam steering system 1014 configured to move the beam waist laterally relative to the workpiece 100 and the workpiece support system 1002. In one embodiment, the beam steering system 1014 can include a galvanometer, a fast steering mirror, an acousto-optic deflector, an electro-optic deflector or the like or a combination thereof. Thus the beam steering system 1014 can be operated to cause the beam waist to be scanned relative to the workpiece 100. Although the laser system 1004 is illustrated as including only one laser 1010, only one beam steering system 1014, and only one optical assembly 1012, it will be appreciated that the laser system 1004 may include any number of lasers, beam steering systems, and optical assemblies as desired in the event that the beam 500 and the laser beam 200 cannot be generated, directed, or focused using common equipment.

The apparatus 1000 may further include a controller 1016 communicatively coupled to one or more of the components of the laser system 1004, to one or more of the components of the workpiece support system 1002, or a combination thereof. The controller 1016 may include a processor 1018 and a memory 1020. The processor 1018 may be configured to execute instructions stored by the memory 1020 to control an operation of at least one component of the laser system 1004, the workpiece support system 1002, or a combination thereof so that the embodiments exemplarily described above with respect to FIGS. 1A to 9 can be performed.

In one embodiment, the controller 1016 may control an operation of one or both the laser system 1004 and the workpiece support system 1002 to form the enhancement region 106. In another embodiment, the controller 1016 may control an operation of at least one of the workpiece support system 1002 and a pre-machining enhancement system 1022 to form the enhancement region 106.

In one embodiment, a pre-machining enhancement system such as pre-machining enhancement system 1022 may be included within the apparatus 1000. The pre-machining enhancement system 1022 can include a enhancement region forming device 1024 operative to form the aforementioned enhancement region 106. The enhancement region forming device 1024 may be coupled to a positioning assembly 1026 (e.g., a dual-axis robot) configured to move the enhancement region forming device 1024 (e.g., along a direction indicated by one or both of arrows 1024*a* and 1024*b*). The enhancement region forming device 1024 may include any device capable of forming the enhancement region 106 discussed above (e.g., a grinding wheel, a cutting blade, a laser source, an ion source, an etchant nozzle, a coolant nozzle, or the like or a combination thereof).

Generally, the processor 1018 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor 1018 includes a programmable microcontroller microprocessor, or other processor that can include one or more processing units arranged to execute instructions stored in memory 1020 in accordance with the operating logic. Memory 1020 can include one or more types including semiconductor, magnetic, and/or optical varieties, and/or may be of a volatile and/or nonvolatile variety. In one embodiment, memory 1020 stores instructions that can be executed by the operating logic. Alternatively or additionally, memory 1020 may store data that is manipulated by the operating logic. In one arrangement, operating logic and memory are included in a controller/processor form of operating logic that manages and controls operational aspects of any component of the apparatus 1000, although in other arrangements they may be separate.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. In view of the foregoing, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A method, comprising:
providing a workpiece having an exterior surface and an interior adjoining the exterior surface, wherein the exterior surface comprises a first major surface and a second major surface that is opposite the first major surface;
employing a pre-machining enhancement process at a first region of the second major surface to generate a plurality of free electrons at the second major surface; and
after employing the pre-machining enhancement process, employing a laser-machining process to machine a feature extending from the first region into the interior of the workpiece adjoining the first region by directing laser energy toward a portion of the first region of the workpiece, wherein the laser-machining process is different from the pre-machining process, wherein the laser energy of the laser-machining process impinges the first major surface and is transmitted through the workpiece to the second major surface, wherein the pre-machining process alters the first region to enhance uniformity of the non-linear absorption of the laser energy at initiation of the laser-machining process at the portion of the first region, and wherein the laser energy has a fluence and/or peak intensity sufficient to stimulate non-linear absorption of the laser energy by the portion of the first region on the second major surface to initiate formation of the feature in the second major surface, and wherein the first region has an area that is greater than or equal to the area of the portion machined at the second major surface of the workpiece.

2. The method of claim 1, wherein the workpiece is a ceramic.

3. The method of claim 1, wherein the workpiece is a semiconductor.

4. The method of claim 1, wherein the workpiece is a metal or a metal alloy.

5. The method of claim 1, wherein the workpiece is glass.

6. The method of claim 5, wherein the glass is unstrengthened glass.

7. The method of claim 5, wherein the glass is strengthened glass.

8. The method of claim 1, wherein the first region of the exterior surface is compressively stressed at a stress of greater than 69 MPa and less than 1 GPa.

9. The method of claim 8, wherein the compressive stress is greater than 100 MPa.

10. The method of claim 9, wherein the compressive stress is greater than 500 MPa.

11. The method of claim 10, wherein the compressive stress is greater than 700 MPa.

12. The method of claim 11, wherein the compressive stress is greater than 1 GPa.

13. The method of claim 1, wherein workpiece includes a compressively-stressed region extending from the first region of the exterior surface into an interior of the workpiece, wherein a thickness of the compressively-stressed region is greater than 20 mm and less than the minimum of the workpiece.

14. The method of claim 13, wherein the thickness of the compressively-stressed region is greater than 40 µm.

15. The method of claim 14, wherein the thickness of the compressively-stressed region is greater than 50 µm.

16. The method of claim 15, wherein the thickness of the compressively-stressed region is greater than 100 µm.

17. The method of claim 1, wherein the pre-machining enhancement process comprises modifying a composition of at least the portion of the first region of the exterior surface.

18. The method of claim 1, wherein the pre-machining enhancement process comprises modifying a surface morphology of at least the portion of the first region of the exterior surface.

19. The method of claim 18, wherein modifying the surface morphology comprises forming one or more cracks within at least the portion of the first region of the exterior surface.

20. The method of claim 18, wherein modifying the surface morphology comprises modifying a surface roughness of at least the portion of the first region of the exterior surface.

21. The method of claim 20, wherein modifying the surface roughness comprises increasing the surface roughness of at least the portion of the first region of the exterior surface.

22. The method of claim 21, wherein modifying the surface morphology comprises chemically etching at least the portion of the first region of the exterior surface.

23. The method of claim 20, wherein modifying the surface morphology comprises sputter etching at least the portion of the first region of the exterior surface.

24. The method of claim 20, wherein modifying the surface morphology comprises mechanically abrading at least the portion of the first region of the exterior surface.

25. The method of claim 20, wherein modifying the surface morphology comprises directing an energy beam onto the first region of the exterior surface.

26. The method of claim 25, wherein the energy beam comprises an electron beam.

27. The method of claim 25, wherein the energy beam comprises a laser beam.

28. The method of claim 27, further comprising directing the laser beam onto the workpiece such that the laser beam is incident on the workpiece at a second region of the exterior surface and thereafter propagates through the workpiece to be incident on the first region.

29. The method of claim 1, wherein the machining process further comprises removing material from multiple portions of the workpiece to form multiple features within the workpiece, wherein the multiple features are spaced apart from each other by material between the portions of the workpiece.

30. The method of claim 29, wherein the multiple features comprise blind holes or through holes in the workpiece.

31. The method of claim 1, wherein at least one laser pulse has a pulse duration in a range from 10 femtoseconds (fs) to 500 nanoseconds (ns).

32. The method of claim 31, wherein the at least one laser pulse has a pulse duration in a range from 1 picosecond (ps) to 100 nanoseconds (ns).

33. The method of claim 32, wherein the at least one laser pulse has a pulse duration in a range from 1 nanosecond (ns) to 50 ns.

34. The method of claim 32, wherein the at least one laser pulse has a pulse duration of less than 20 nanoseconds (ns).

35. The method of claim 32, wherein the at least one laser pulse has a pulse duration of 10 nanoseconds (ns).

36. The method of claim 1, further comprising:
generating a second plurality of free electrons or creating defects at a second region of the exterior, wherein the second region is spaced apart from the first region; and
machining a second portion of the workpiece adjoining the second region by directing the laser energy onto the workpiece.

37. The method of claim 36, further comprising generating the second plurality of free electrons at the second region in the same or different manner as generating the plurality of free electrons at the first region.

38. The method of claim 1, wherein the generating comprises arranging the first region of the exterior surface adjacent to donor object;
removing donor material from the donor object; and
introducing the removed donor material to the workpiece.

39. The method of claim 38, wherein directing the energy beam onto the donor object comprises directing the energy beam through the workpiece and subsequently onto the donor object.

40. The method of claim 38, wherein the donor object abuts the first region of the exterior surface.

41. The method of claim 1, wherein the plurality of free electrons are generated by creating defects at the first region of the exterior surface.

42. The method of claim 1, wherein the plurality of free electrons are generated by roughening the first region of the exterior surface.

43. The method of claim 42, wherein the pre-machining process causes the exterior surface within the first region to exhibit an R(a) roughness average value between 2 microns and 9 microns.

44. The method of claim 1, wherein the laser energy has a beam waist located at one of the first or second major surfaces or outside of the workpiece, wherein the non-linear absorption includes avalanche-dominated absorption of the laser energy by the workpiece, wherein the laser-machining process comprises removing material from multiple portions of the workpiece to form multiple features within the workpiece, and wherein the multiple features are spaced apart from each other by material between the portions of the workpiece.

45. The method of claim 1, wherein the laser energy directed onto the workpiece is second laser energy, wherein the plurality of free electrons at the first region are generated by directing first laser energy onto the workpiece, wherein the first laser energy is distinct from the second laser energy, wherein the first laser energy has a wavelength, wherein the workpiece is transparent to the wavelength of the first laser energy, wherein a beam waist of the first laser energy is located at one of the first or second major surfaces or outside of the workpiece, and wherein the first laser energy has an intensity greater than $10^{12}$ W/cm$^2$.

46. The method of claim 1, wherein the machining process forms a feature at the machined portion that exhibits associated surface chips having an average size that is less than 40 microns.

47. The method of claim 1, wherein the machining process forms a feature at the machined portion that is devoid of nubs of material protruding into the feature.

48. The method of claim 1, wherein the pre-machining enhancement process introduces negatively charged ions into the first region by one of ion implantation or diffusion.

49. The method of claim 1, wherein the exterior surface comprises one or more side surfaces extending from the first major surface to the second major surface, wherein the first region is spaced apart from the side surfaces, and wherein the feature is spaced apart from the side surfaces.

50. The method of claim 49, wherein the workpiece comprises a substrate of strengthened glass, wherein the substrate has a compression region extending from the second major surface into the interior of the substrate and the substrate has a tension region adjacent to the compression region.

* * * * *